United States Patent [19]
Owen

[11] 3,902,795
[45] Sept. 2, 1975

[54] VISUAL-FIELD TESTING

[75] Inventor: David Ainslie Owen, Isleworth, England

[73] Assignee: National Research Development Corporation, London, England

[22] Filed: June 10, 1974

[21] Appl. No.: 478,068

[30] Foreign Application Priority Data
June 12, 1973 United Kingdom............... 27901/73

[52] U.S. Cl................................... 351/23; 351/39
[51] Int. Cl.² ........................................ A61B 3/02
[58] Field of Search......................... 351/23, 24, 39

[56] References Cited
UNITED STATES PATENTS
2,868,068  1/1959  Richairds.......................... 351/24 X
3,746,433  7/1973  Omoto.............................. 351/23 X OTHER PUBLICATIONS
Irvine, "Measuring Scotoms... Test," *Amer. J. Opth.* Part II, Vol. 61, No. 5, May 1966, pp. 1177–1187.

*Primary Examiner*—Paul A. Sacher
*Attorney, Agent, or Firm*—Cushman, Darby & Cushman

[57] ABSTRACT

Visual-field testing is effected in a binocular manner by use of a polarized fixation target representation and a non-polarized movable target representation viewed through eye pieces incorporating prismatic means to induce double vision and, in one eye piece, a perpendicularly orientated polarizing filter. Thus a single fixation target representation and two moving target representations are normally seen, but one of the latter disappears in a pathologically blind area for either eye. The separation of the moving target representations is preferably varied together with the spacing between the two targets. Also it is advantageous to employ a triangular arrangement with the screen in one side, the eye pieces in another, and a mirror in the third side, so that the screen is viewed by reflection from the mirror.

10 Claims, 1 Drawing Figure

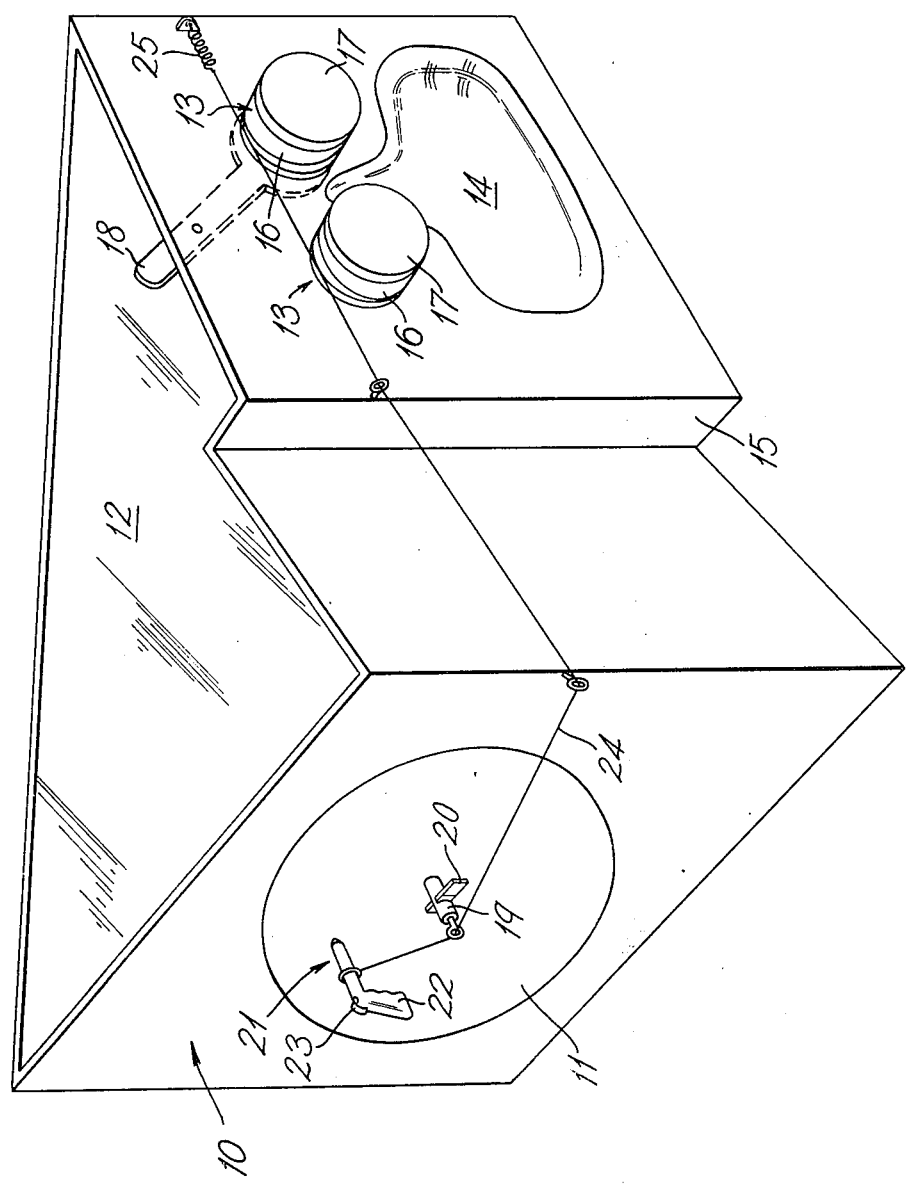

VISUAL-FIELD TESTING

Visual-field testing is normally conducted in monocular manner. The usual procedure is to occlude one eye of the patient under test, and to have the patient fix the line of sight of his other eye on a stationary target located in the central area of the field of that eye while, at the same time, a second target in the form of a light is flashed at varying locations in the field around the stationary target. If the patient fails to observe the light when located other than within the physiological 'blind spots,' then he has a pathological field defect in the relevant location which requires further and more detailed examination.

This testing is clearly time-consuming and, since it must be effected separately for each of the patient's eyes, there is advantage to be gained by any saving in the overall testing time.

According to the invention in a broader aspect thereof such a saving is obtained by conducting visual-field testing in a binocular manner. More specifically it is proposed that the patient fix his lines of sight on a single stationary target while respective mutually separated, second, movable target representations are simultaneously presented to the patient's eyes in an intermittent manner. Then, if the patient sees only one second target in a region other than a blind spot, he has a field defect and successive occlusion of the eyes establishes which is subject to the relevant defect.

In practice it is preferred that the second target representations should not be subjected to a large mutual separation, but appear as distinguishable targets in respective adjacent locations within the visual field determined by the single stationary target.

Conveniently the second target representations are obtained from a single source by inducing a double-vision by the use of separate eye pieces through which the the patient views the targets, and which eye pieces comprise prismatic means of respectively different powers. In such circumstances, induction of double-vision in respect of the stationary first target can be obviated by the use of mutually orthogonal polarising filters in association with such target and one of the eye pieces.

Also, it is preferred that the mutual separation of the second target representations should increase with their spacing from the first target to take account of the increasing difficulty in distinguishing the representations towards the periphery of the visual field. Again, this is conveniently effected by the use of prismatic means as mentioned above; at least one of such means being of adjustable power and coupled for appropriate adjustment with movement of the second target.

From the foregoing discussion of the invention it will be appreciated that, in another aspect, there is also provided apparatus for carrying out the proposed testing procedure. These aspects of the invention will now be further clarified by way of example with reference to the accompanying drawing which diagrammatically illustrates a prototype embodiment of the invention.

The illustrated embodiment comprises a housing 10 which is generally triangular in plan view and carries in a first side a circular translucent screen 11, supports an inwardly facing mirror 12 in a second side thereof, and houses two eye pieces 13 in its third side. The triangular configuration of the housing 10 is arranged so that a patient can, from without the housing, use the eye pieces 13 to view the screen 11 as reflected by the mirror 12. The third side of the housing 10 is recessed at 14 below the eye pieces 13 to allow close access of the patient's face to the eye pieces, and the same side of the housing is also stepped inwardly at 15 as it approaches the side which carries the screen 10 so that the screen is masked from direct view at the eye pieces.

The eye pieces 13 each comprise a pair of prisms 16 which are mutually rotatable in face-to-face manner to vary the combined prismatic power thereof, and such prismatic means are commonly referred to as Risley prisms. In this particular instance one prism of each pair is held stationary, the other two prisms are rotatable, the tapers of the two stationary prisms are oppositely directed, and the tapers of the two rotatable prisms are oppositely directed. The eye pieces 13 also comprise respective polarising filters 17 which are mutually orthogonal. The eye pieces 13 are further associated with a mask 18 suspended within the housing 10 from a pivotal connection above the level of the eye pieces, whereby the eye pieces can be individually occluded.

The screen 11 is provided with a stationary first target 19 in the form of a light source located outside the housing and at the centre of the screen to produce a light spot. The target 19 also comprises a filter assembly 20 slidable between the light source and the screen, which assembly comprises two separate polarising filter portions which are respectively parallel with the filters 17 of the eye pieces and, therefore, mutually orthogonal.

The screen 11 is further associated with a movable second target 21 in the form of a light source within a manually grippable casing 22 which is conveniently of pistol shape and is provided with a thumb-operable switch 23 at the upper rear corner thereof whereby the target can be intermittently operated. This second target casing 22 is separably coupled by a flexible linkage 24 with the two rotatable prisms to rotate the same in response to separation of the second target from the first target in a radial sense relative to the screen 11, whereby the powers of the prism-pairs 16 are correspondingly varied to afford prismatic deviation between the eye pieces 13. In order that this variable deviation be reversible the rotatable prisms are biassed, suitably by connection of a spring 25 between the relevant prisms and the housing 10, towards dispositions in which their tapers are directed in opposite senses to their respective stationary prisms.

Also, the prism pairs are of similar form, but with the prisms of the one pair being of equal power, and the prisms of the other pair being of respective powers differing by a small order, suitably about 4 Dioptres. Thus, when the prisms are in positions corresponding to small radial separation of the two targets, there is still a discernible prismatic deviation between the eye pieces.

In use of the illustrated apparatus, the stationary first target 19 is energised and the patient, as noted above, views the screen 11, as reflected by the mirror 12, through the eye pieces 13. The patient sees only one stationary target through the eye pieces 13 of which the polarising filter 17 is parallel with the effective portion in the filter assembly 20. Thereafter the patient fixes his lines of sight on this single target, while the operator conducting the test moves the second target casing 22 over the screen 11 into successively different positions and operates the switch 23 to flash the second target.

If the patient has no visual-field defect at any location represented by second target, he will see two second targets by virtue of the relative prismatic deviation between the eye pieces 13, whereas sighting of only one second target indicates a defect.

This procedure can form the basis of a screening procedure to identify those of the relatively small proportion of the population having visual-field defects, and only such persons need be subjected to a more time-consuming examination of the conventional monocular form. Moreover, this further examination can be conducted with use of the same apparatus by occluding one of the eye pieces 13 with the mask 18, matching the effective portion of filter assembly 20 with the filter 17 of the non-occluded eye piece 13, disconnecting the linkage 24, and again moving the second target, with intermittent operation, to provide a second target which is substantially undeviated by the non-occluded eye piece prisms. In addition, the second target can be moved continuously across the screen in the manner of a dynamic test, and this target can be coloured for use in respect of particular defective conditions. Also, the brightness of the targets is preferably adjustable.

This further procedure allows the operator to determine accurately, on a monocular basis, the localities of visual-field defects in the patient's eyes and these localities can be conveniently mapped by marking the outer face of the screen with an erasable medium to represent defect localities and, if appropriate, with two mutually distinctive erasable media, such as differently coloured crayons, to represent left and right eye defects.

The present invention as represented by the illustrated embodiment affords advantages additional to that of providing a basis for binocular screen in respect of visual-field defects, while also affording the possibility of conventional monocular testing. In addition, the triangular arrangement of the housing 10 is considered advantageous in that the operator can view the patient from the side and judge whether the latter is suitably attentive, whereas conventionally the operator and patient are in face-to-face disposition with the apparatus therebetween. Moreover, in the conventional apparatus the intermittent second target location as seen by the operator relative to the screen is in a mirror-imaged relationship with defect locations relative to the patient's field of view whereas in the preferred arrangement of the present invention the mirror 12 serves to provide a secondary mirror-image reversal affording an overall undistorted relationship between the operator's view of the patient's visual field. A further advantage of the mirror is to effectively increase the separation of the patient from the target representations without requiring an unduly extensive apparatus.

Notwithstanding these additional advantages, it will be appreciated that, while described with more particular reference to the illustrated embodiment, the invention is open to variation and modification within the scope of the introductory discussion thereof hereinbefore. For example, while advantageous, the triangular configuration and mirror are not essential to the primary attainment of binocular visual-field testing. In another example, effective occlusion of one eye piece in respect of the second target can be effected by use of a polarising filter slide in the relevant housing in a similar manner to that of the first target, thus allowing all adjustments to be conducted remotely from the patient once the testing procedure is initiated.

We claim:

1. A method of visual-field testing which comprises: presenting a first representation of a stationary fixation target to one eye of a patient; and, while maintaining such presentation, simultaneously presenting to respective ones of both eyes of the patient two mutually separated second representations of a movable target in an intermittent manner and in varying positions within the visual field determined by said first representation.

2. A method according to claim 1 which comprises varying the separation between said second representations to increase and decrease with the spacing of such representations from said first representation.

3. Visual-field testing apparatus comprising: a screen; a first, fixation target mounted in stationary relationship adjacent said screen; first polarising means located intermediate said fixation target and said screen; a second target mounted in movable relationship adjacent said screen; binocular eye pieces through which a patient views said screen; second polarising means incorporated in one of said eye pieces, such means being orientated perpendicularly to said first such means whereby a first representation of said first target is viewed only through the other one of said eye pieces; and prismatic means incorporated in said eye pieces to effect separation of the respective second representations of said second target as viewed through said eye pieces.

4. Apparatus according to claim 3 wherein said prismatic means are of adjustable power, and such means are connected for adjustment with movement of said second target to increase and decrease the prismatic deviation between said second representations with the spacing of said second target from said first target.

5. Apparatus according to claim 4 wherein separate parts of said prismatic means of respectively different power are individually incorporated in said eye pieces.

6. Apparatus according to claim 5 wherein said separate parts each comprise a Risley prism, and such prisms differ in minimum power by about 4 Dioptres.

7. Apparatus according to claim 3 wherein said first polarising means comprises two mutually perpendicularly orientated filters, alternatively locatable intermediate said first target and said screen, said second polarising means comprises a filter orientated parallel to one of said two filters, and said other eye piece incorporates a polarising filter orientated perpendicularly to one of said two filters.

8. Apparatus according to claim 3 comprising a hollowed housing with three walls defining a generally triangular cross-sectional shape, one of said walls including said screen, another of said walls including said eye pieces, and the remaining one of said walls including a mirror, whereby said screen is viewed through said eye pieces by reflection from said mirror.

9. Apparatus according to claim 3 comprising means to alternatively occlude one of said eye pieces.

10. Apparatus according to claim 4 wherein said adjustment connection is disconnectable.

* * * * *